United States Patent
Poole et al.

(10) Patent No.: US 9,849,504 B2
(45) Date of Patent: Dec. 26, 2017

(54) METALLIC GLASS PARTS INCLUDING CORE AND SHELL

(71) Applicant: Apple Inc., Cupertino, CA (US)

(72) Inventors: Joseph C. Poole, San Francisco, CA (US); Theodore A. Waniuk, Lake Forest, CA (US); Jeffrey L. Mattlin, San Francisco, CA (US); Michael S. Nashner, San Jose, CA (US); Christopher D. Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 14/690,269

(22) Filed: Apr. 17, 2015

(65) Prior Publication Data

US 2015/0314566 A1    Nov. 5, 2015

Related U.S. Application Data

(60) Provisional application No. 61/986,816, filed on Apr. 30, 2014.

(51) Int. Cl.
| | |
|---|---|
| *B21D 39/00* | (2006.01) |
| *B22D 19/16* | (2006.01) |
| *C22C 1/00* | (2006.01) |
| *B32B 15/01* | (2006.01) |
| *C22C 45/00* | (2006.01) |

(52) U.S. Cl.
CPC ............. *B22D 19/16* (2013.01); *B32B 15/01* (2013.01); *C22C 1/00* (2013.01); *C22C 1/002* (2013.01); *C22C 45/00* (2013.01); *Y10T 428/12486* (2015.01)

(58) Field of Classification Search
CPC .......... B22D 19/16; B32B 15/01; C22C 1/00; C22C 1/002; C22C 45/00; Y10T 428/12486
See application file for complete search history.

(56) References Cited

U.S. PATENT DOCUMENTS

| | | |
|---|---|---|
| 4,386,896 A | 6/1983 | Ray |
| 5,288,344 A | 2/1994 | Peker et al. |
| 5,368,659 A | 11/1994 | Peker et al. |
| 5,618,359 A | 4/1997 | Lin et al. |
| 5,647,921 A | 7/1997 | Odagawa et al. |
| 5,735,975 A | 4/1998 | Lin et al. |

(Continued)

FOREIGN PATENT DOCUMENTS

| | | |
|---|---|---|
| JP | 2001-303218 | 10/2001 |
| JP | 2009173964 A | * 8/2009 |

OTHER PUBLICATIONS

Translation of JP-200917396A. Masai et al., Metallic glass alloy composite and the method for producing metallic glass alloy composite (translated: Jun. 4, 2017).*

(Continued)

*Primary Examiner* — Humera Sheikh
*Assistant Examiner* — Elizabeth Collister
(74) *Attorney, Agent, or Firm* — Polsinelli PC (57) ABSTRACT

A metallic glass part is provided. The metallic glass part includes an alloy core and a metallic glass shell surrounding the alloy core. The alloy core provides compressive force on the metallic glass shell at an interface between the alloy core and the metallic glass shell.

2 Claims, 6 Drawing Sheets

(56) References Cited

U.S. PATENT DOCUMENTS

| | | | |
|---|---|---|---|
| 6,086,651 A | 7/2000 | Mizushima | |
| 6,325,868 B1 | 12/2001 | Kim et al. | |
| 6,749,700 B2 | 6/2004 | Sunakawa et al. | |
| 7,575,040 B2 | 8/2009 | Johnson | |
| 2006/0157164 A1 | 7/2006 | Johnson et al. | |
| 2006/0254386 A1 | 11/2006 | Inoue et al. | |
| 2007/0003782 A1 | 1/2007 | Collier | |
| 2007/0079907 A1 | 4/2007 | Johnson et al. | |
| 2007/0111119 A1 | 5/2007 | Hu et al. | |
| 2008/0118387 A1 | 5/2008 | Demetriou et al. | |
| 2008/0209976 A1 | 9/2008 | Deneuville | |
| 2009/0139858 A1 | 6/2009 | Nakamura et al. | |
| 2010/0084052 A1 | 4/2010 | Farmer et al. | |
| 2010/0300148 A1 | 12/2010 | Demetriou et al. | |
| 2010/0310901 A1 | 12/2010 | Making et al. | |
| 2011/0165339 A1 | 7/2011 | Skoglund et al. | |
| 2012/0174976 A1 | 7/2012 | Kim et al. | |
| 2012/0247948 A1 | 10/2012 | Shin et al. | |
| 2012/0312061 A1 | 12/2012 | Pham et al. | |
| 2012/0325051 A1 | 12/2012 | Watson | |
| 2013/0139964 A1 | 6/2013 | Hofmann et al. | |
| 2013/0309121 A1 | 11/2013 | Prest et al. | |
| 2014/0334106 A1 | 11/2014 | Prest et al. | |
| 2015/0202841 A1* | 7/2015 | Verreault | B32B 15/01 428/649 |
| 2015/0267286 A1 | 9/2015 | Na et al. | |
| 2015/0299825 A1 | 10/2015 | Poole et al. | |
| 2015/0315678 A1 | 11/2015 | Poole et al. | |
| 2015/0315687 A1 | 11/2015 | Poole et al. | |
| 2016/0024630 A1 | 1/2016 | Weber et al. | |

OTHER PUBLICATIONS

Kato, H. et al., Relationship between thermal expansion coefficient and glass transition temperature in metallic glasses, (2008), Scripta Materialia, 58, 1106-1109.*

Conner, R. et al., Mechanical Properties of Tungsten and Steel Fiber Reinforced Zr41.25Ti13.75Cu12.5Ni10Be22.5 Metallic Glass Matrix Composites, (1998), Acta Meteriaila, (V46 No. 17), 6089-6102.*

Shackelford, James F. Alexander, William, CRC Materials Science and Engineering Handbook, (2001), Taylor & Francis, (3rd Edition), Table 112.*

Shen et al., "Bulk Glassy $Co_{43}Fe_{20}Ta_{5.5}B_{31.5}$ Alloy with High Glass-Forming Ability and Good Soft Magnetic Properties," *Materials Transactions*, vol. 42, No. 10 (2001) pp. 2136-2139.

Inoue et al., "Bulk Amorphous Alloys with High Mechanical Strength and Good Soft Magnetic Properties in Pe-TM-B (TM=IV-VII Group Transition Metal) System," *Appl. Phys. Lett.*, vol. 71, (1997) pp. 464.

Hays et al., "Microstructure Controlled Shear Band Pattern Formation and Enhanced Plasticity of Bulk Metallic Glasses Containing in situ Formed Ductile Phase Dendrite Dispersions," *Physical Review Letters*, Mar. 2000, vol. 84, No. 13, pp. 2901-2904.

* cited by examiner

METALLIC GLASS PARTS INCLUDING CORE AND SHELL

CROSS-REFERENCE TO RELATED APPLICATIONS

The present application claims the benefit of U.S. Provisional Patent Application No. 61/981,816, entitled "Method for Constructing Three-Dimensional Parts Using Metallic Imparting Surface Stress on Parts, and Local Laser Annealing," filed on Apr. 30, 2014, which is incorporated herein by reference in its entirety.

FIELD

The present disclosure is directed to methods of constructing parts using metallic glass alloys, and metallic glass alloy materials for use therewith.

BACKGROUND

Bulk-solidifying amorphous alloys, also referred to as metallic glass-forming alloys, or Bulk metallic glasses ("BMGs") have been made in a variety of metallic systems. They are generally prepared by quenching from above the melting temperature to the ambient temperature. Generally, high cooling rates such as on the order of $10^{5\circ}$ C./sec to $10^{3\circ}$ C./sec, are needed to achieve an amorphous structure. The lowest rate by which a BMG can be cooled to avoid crystallization, thereby achieving and maintaining the amorphous structure during cooling, is referred to as the critical cooling rate for the bulk alloy. In order to achieve a cooling rate higher than the critical cooling rate, heat has to be extracted from the sample. The thickness of articles made from metallic glass-forming alloys often becomes a limiting dimension, which is generally referred to as the critical (casting) thickness.

There exists a need for methods of constructing three-dimensional parts using bulk metallic glasses or metallic glass-forming alloys, as well as a need for metallic glass-forming materials designed for use in such methods.

SUMMARY

In various aspects, the disclosure is directed to a metallic glass part having a metallic glass shell having an internal alloy core. The metallic glass shell retains its amorphous structure while the internal alloy core can be a crystalline alloy, amorphous alloy, or combination of both. The alloy can be formed by any method known in the art, including casting methods and injection molded methods. In some embodiments, the alloy core can be in a crystalline phase. The core can be any alloy known in the art. In various embodiments, the alloy occupies an internal cavity within the metallic glass part. In various aspects, the shell and alloy core connect at an interface via chemical bonds or physical bonds. In various aspects, the shell has mechanical interlocks that engage with the alloy in the cavity. The volumetric reduction of the alloy in the cavity provides a compressive force to the surface of the metallic glass shell. The compressive force of the metallic glass shell can improve the reliability of mechanical loading. In other aspects, the metallic glass shell can be formed around the alloy core.

The parts can be made by layering methods. The disclosure is directed to methods of improving properties of metallic glass parts.

In accordance with certain aspects, a layer of a metallic glass-forming alloy powder, wire, or sheet is deposited to selected positions and then fused to a layer below by suitable methods such as laser heating or electron beam heating. The deposition and fusing are then repeated as need to construct the part, layer by layer.

In various aspects, the metallic glass-forming powder is an atomized metallic glass-forming powder. In certain aspects, the metallic glass-forming powder is a homogenous atomized metallic glass-forming powder. For instance, a metallic glass-forming alloy may be atomized during cooling to form an atomized metallic glass-forming powder, and the atomized metallic glass-forming powder may be mixed to provide a homogenous atomized metallic glass-forming powder.

In another aspect, the disclosure is directed to relieving stress in metallic glass part by localized laser annealing. The laser annealing can occur during selective laser melting (SLM), taking advantage of the reduced viscosity of the alloy after the glass transition. Localized stressing in the metallic glass part can be relieved by locally heating regions of the metallic glass part with a laser.

A laser is used to thermally anneal the print surface of a part during SLM. The laser can be either the laser used to anneal parts, or the laser can be a separate laser. The print surface is heated to a temperature higher than the glass transition temperature (Tg). This process allows internal stresses and the gradient to relax. The higher the internal stress magnitude in a given region of a part, the more quickly it relaxes at a given temperature.

In certain embodiments, one or more sections or layers of material that are not a metallic glass can be included as needed to form a composite final part. For instance, sections or layers of non-amorphous material, Kevlar fiber, and/or non-heated metallic glass-forming powder, can be included to form composite parts.

BRIEF DESCRIPTION OF FIGURES

Although the following figures and description illustrate specific embodiments and examples, the skilled artisan will appreciate that various changes and modifications may be made without departing from the spirit and scope of the disclosure. The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Metallic glass-forming alloys, bulk-solidifying amorphous alloys, or BMGs, are a class of metallic materials. These alloys may be solidified and cooled at relatively slow rates, and they retain the amorphous, non-crystalline (i.e., glassy) state at room temperature. Amorphous alloys (also referred to as metallic glasses) have many superior properties compared to their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in metallic glass parts, there is a need to develop methods for fabricating metallic glass parts that have a controlled amount of amorphicity.

In accordance with the present disclosure, methods of constructing a three-dimensional part using metallic glass-forming alloys, layer by layer (i.e. printing or layer deposition) are provided. In certain aspects, a layer of metallic glass-forming alloy (such as a powder, wire or sheet) or metallic glass material is deposited to selected positions, and then fused to a layer below by suitable methods such as laser heating or electron beam heating. Specific regions can be heated by techniques such as selective laser melting (SLM). The deposition and fusing are then repeated as need to construct the part, layer by layer. In certain aspects, methods and final parts are improved by providing metallic glass-forming alloys, wires, or sheets of metallic glass material and optional materials that are not metallic glasses, with desired properties.

The metallic glass-forming alloy (and metallic glass materials may comprise a metallic glass-forming alloy, a mixture of the alloys, or constituent elements or precursors of metallic glass-forming alloys (master alloys)), as described in further detail herein.

In certain embodiments, a homogenous atomized metallic glass-forming powder is provided. In certain aspects, such powders may provide improved glass-forming ability and repeatability of quality of final parts. Metallic glass-forming alloys are sensitive to compositional variations, with changes as little as 0.1 wt % affecting the glass-forming ability (GFA) of an alloy. For instance, metallic glass-forming alloys are generally composed of at least three, four, or more, different elements, which sometimes have very different densities, creating potential issues with solubility and compositional homogeneity.

To address these potential issues, in certain aspects, the metallic glass-forming alloy is a homogenous atomized powder. For instance, a metallic glass-forming alloy may be gas atomized during cooling to form an atomized powder, and the atomized powder may be mixed in any suitable manner known in the art, e.g., mechanical mixing, to provide a homogenous atomized metallic glass-forming powder. In certain aspects, homogenous atomized metallic glass-forming powders are useful in the methods described herein to provide repeatability of quality of final parts, as compared to final parts prepared using metallic glass-forming powder with homogeneous properties formed from sectioning and re-melting alloy ingots.

In an atomization process, the cooling rate which each element of an alloy sees is very high due to the small particle size and large surface area for thermal heat transfer. Atomizing gases may also be subject to rapid expansion through nozzles, causing them to be at low temperature (e.g., below 0° C.) when impinging on the alloy, which will further increase the cooling rates. Due to this high cooling rate, an alloy that is atomized is very likely to be highly amorphous (high viscosity is reached before crystals are able to nucleate and grow). In various embodiments, the atomizing gas can be argon or other similar inert gases. In other embodiments, the atomization process can include water or other liquid atomization, and in still other embodiments, the atomization process can include centrifugal atomization. Liquid atomization may be selected for less reactive metallic glasses because liquid atomization is generally less expensive and has higher yield compared to typical gas atomization processes.

Figure 1:
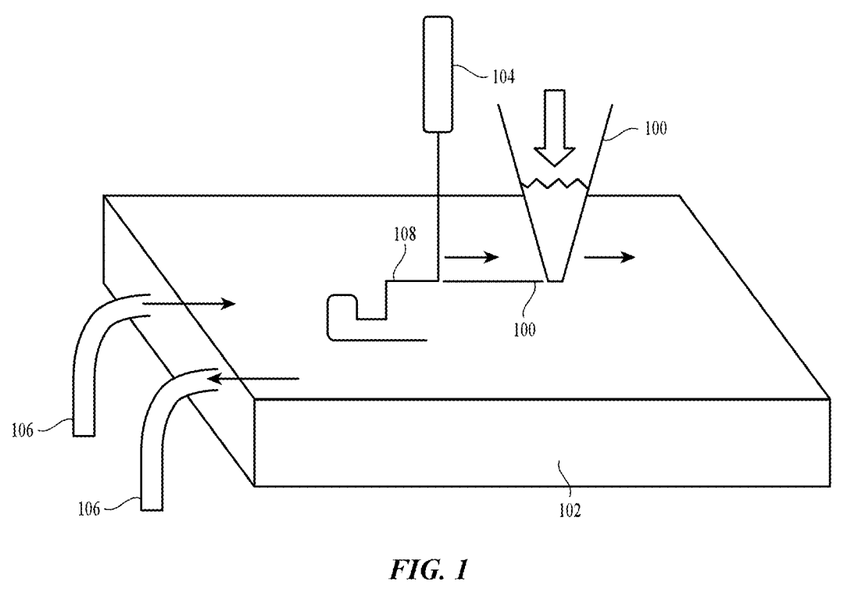
FIG. 1 depicts an exemplary method of constructing a part from metallic glass-forming powder layer by layer.

FIG. 1 depicts an exemplary method of constructing a metallic glass part using a platen, and outlet that deposits metallic glass alloy on the platen, and a heat source. According to an embodiment as shown in FIG. 1, a metallic glass-forming alloy 100 can be deposited to selected positions on a platen 102 and heated (e.g., within 0.1 second, 0.5 second, 1 second or 5 seconds from the time the alloy contacts a layer below) by a suitable heater 104 (e.g. a laser or electron beam) so as to fuse the alloy to a layer below. The alloy is heated to a temperature above its melting temperature. In some embodiments, the platen 102 can be cooled, for example, by cooling lines 106, through which a cooling fluid such as water or a gas can be flowed. Alternatively, the platen can be cooled by thermoelectric cooling methods. In other embodiments, the platen can be a passive heat sink. Alternatively, the platen can be slightly heated to avoid build-up of internal stress within the metallic glass. The platen 102 can reduce the thermal exposure of particles that have been previously layered, thereby reducing the likelihood that such particles can be converted to crystalline form during formation of additional layers. The resulting metallic glass-forming powder can be fused to form fused metallic glass 108. As will be understood by those of skill in the art, the initial and final layers of material may or may not be processed in the same manner.

Numerous variations of the device are possible. For example, as will be understood by those of skill in the art, the initial and final layers of material may or may not be processed in the same manner. Further, a wire or sheet may be used instead of a powder. The platen may move or be stationary, or components dispensing the metallic glass can move or be stationary. Alternatively, the platen surface can be covered with the metallic glass-forming alloy, and the alloy can be heated (e.g. by a laser or electron beam) at the positions at which a metallic glass is to be created.

In various embodiments, the platen can be temperature regulated. In some embodiments, the platen as described in various embodiments herein can be cooled, for example, by cooling lines, through which a cooling fluid such as water or a gas can be flowed. Alternatively, the platen can be cooled by thermoelectric cooling methods. In other embodiments, the platen can be a passive heat sink. Alternatively, the platen can be heated. Without wishing to be limited to any mechanism or mode of action, the platen can be heated to reduce or avoid increase of internal stress within the metallic glass on formation.

The metallic glass-forming powder can be deposited from any suitable outlet, such as a nozzle. In one embodiment, the powder can be deposited from a plurality of outlets, movement of each of which can be independently or collectively controlled. The heater can be any suitable heater such as a laser, electron beam, ultrasonic sound wave, infrared light, etc. The powder can be deposited onto the selected positions by moving the outlet, moving the platen or both so that the outlet is positioned at the selected positions relative to the platen. Flow of the powder from the outlet can be controlled by a shutter or valve. The movement of the outlet and/or platen, and the shutter or valve can be controlled by a computer. A part of a desired shape can be constructed by depositing and fusing the powder layer by layer. According to an embodiment, the fused powder can be smoothed by a suitable method, such as polishing and grinding, before the next layer of powder is deposited thereon.

In accordance with certain embodiments, composite parts may be formed by depositing one or more layers of material that is not a metallic glass. For instance, one or more layers of material that is not a metallic glass (e.g., non-heated metallic glass-forming alloy, non-amorphous materials, Kevlar fibers, plastic, ceramic or other insulators, other metals or semi-conductors) can be similarly deposited and fused on to a layer of amorphous metal below. In various configurations, the powder or wire can be dispensed with two or more nozzles. In a further configuration and alternative to layering, a nozzle can dispense individual granules of crystalline material to create a matrix composite.

Figure 2:
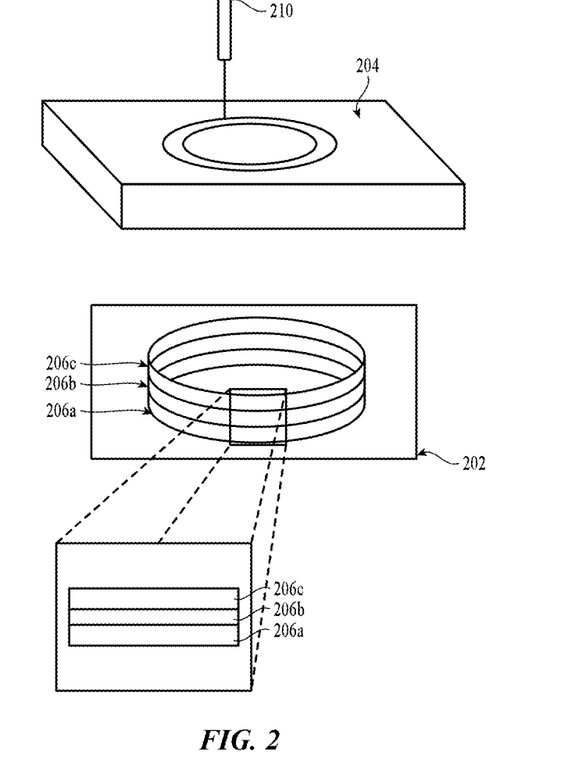
FIG. 2 depicts an exemplary method of constructing a part from metallic glass sheets layer by layer.

FIG. 2 shows an exemplary part made from metallic glass and non-metallic glass-forming alloy (in powder, wire, or sheet forms) layer by layer. Metallic glass feedstock 204 is cut using laser cutting tool 210. This cutting is repeated for each layer 206a, 206b, and 206c. Stacked layers 206a, 206b, and 206c can be fused by applying heat and/or pressure using any suitable method such as hot pressing, laser irradiation, electron beam irradiation, or induction heating. The heating can be done while the stacked layers 206a and 206b are on platen 202. Though three layers are depicted in FIG. 2, any number of layers can be fused using the described method. Although FIG. 2 depicts the layers are having distinct boundaries at an interface between adjacent layers, such does not have to be the case. In some embodiments, if the layers may be fused at the interface between each adjacent layer. In other embodiments, if there may be some diffusion between the layers at an interface between adjacent layers.

Figure 3:
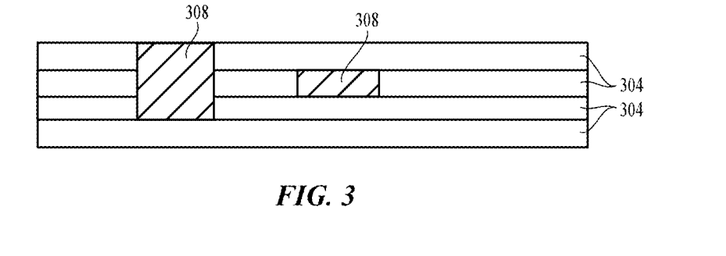
FIG. 3 depicts an exemplary composite part made from metallic glass-forming alloy and material which does not form metallic glass sheets layer by layer.

In an alternative embodiment as shown in FIG. 3, a plurality of layers of metallic glass material can be cut by a suitable method such as laser or die cutting, from one or more layers of metallic glass material 304 formed from the metallic glass-forming alloy described herein. The layers of metallic glass correspond to cross-sections of a part to be made. Alternatively, thin sheets can be extruded directly from a melt or created by melt spinning instead of using a powder. The plurality of layers of metallic glass and optionally one or more non-metallic glass layers 308 (e.g., non-heated metallic glass-forming alloy, non-amorphous materials, crystalline material, Kevlar fibers, plastic, ceramic or other insulators, other metals or semi-conductors) can then be stacked in desired spatial relations among the layers onto a platen and fused to form the part. In some embodiments, a non-metallic glass material that is in a granulated form can be added selectively added to the layers of metallic glass to form a matrix with of non-metallic glass interspersed between regions of metallic glass.

In another embodiment, the disclosure is directed to relieving stress in an amorphous metal part by localized laser annealing. For example, the laser annealing can occur during SLM, taking advantage of the reduced viscosity of the alloy after the glass transition. In various aspects, a laser is used to thermally anneal the print surface of a part during fusion such as SLS or SLM.

Parts made by SLM of alloys are subject to internal stresses from solidification shrinkage, and from thermal expansion with large temperature gradients. Internal stresses in an SLM manufactured part can cause warpage as the part is printed, or when the part is removed from its base or support structure. Warpage reduces the dimensional accuracy of the final part. Internal stresses in an SLM manufactured part can also cause delamination and cracking of the part.

In various aspects, amorphous metals, also known as metallic glasses, are less susceptible to the effect of solidification shrinkage because amorphous metals do not have a solidification shrinkage step used in manufacturing conventional crystalline metals. The metals harden by a gradual increase in viscosity to a point where the metal appears solid (e.g. at a viscosity of 1012 poise).

Metallic glasses generally have lower thermal conductivity than their crystalline alloy counterparts due to their disordered structure and the low mean free path of phonons. As a result, metallic glasses have more severe thermal gradients on and just below the print surface during a SLM process. In various embodiments, the larger thermal gradients can result in higher stresses being present in parts, that can lead to warpage and cracking.

In various aspects, a laser is used to thermally anneal the print surface of a part during fusion, such as by laser heating or electron beam heating. The laser can be either the laser used to anneal parts, or the laser can be a separate laser. The print surface is heated to a temperature higher than the glass transition temperature (Tg). This process allows internal stresses and the gradient to relax. The higher the internal stress magnitude in a given region of a part, the more quickly it relaxes at a given temperature.

Without intending to be limited by theory, metallic glass-forming alloys may be sensitive to oxygen content. For instance, oxides within an alloy may promote nucleation of crystals thereby detracting from formation of an amorphous microstructure. Some metallic glass-forming alloy compositions form persistent oxide layers, which may interfere with the fusion of particles. Further, surface oxides may also be incorporated into the bulk alloy and may degrade the glass-forming ability of the alloy.

Figure 4A:
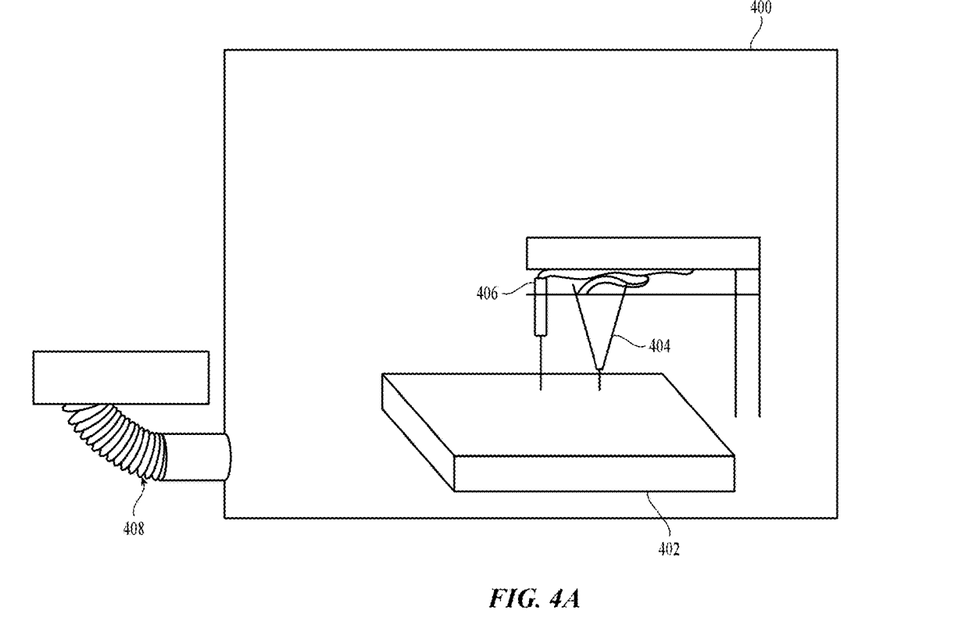
FIG. 4A depicts an exemplary enclosure for providing a vacuum, inert or reducing atmosphere.
Figure 4B:
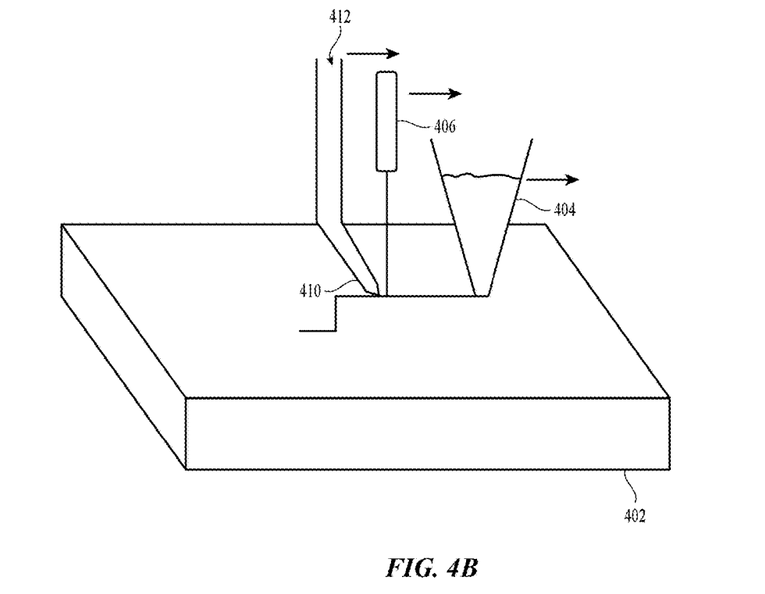
FIG. 4B depicts s an exemplary scheme to locally provide an inert or reducing atmosphere.

As such, in certain embodiments, it may be desirable to protect the as-deposited powder (or wires/sheets of metallic glass material, not shown) in an inert atmosphere, a reducing atmosphere or in vacuum while the powder is being heated, to remove oxygen from particle interfaces and from the final part. As shown in FIG. 4A, the platen 402, the outlet 404 and the heater 406 can be in an enclosure 400 placed under a vacuum (e.g., 1-10 mTorr) by evacuation pump 408, a reducing atmosphere (e.g., hydrogen or a mixture of hydrogen and nitrogen), or an inert atmosphere (e.g., argon, nitrogen, or other inert gases). The enclosure can be pumped by an evacuation pump. Alternatively, as shown in FIG. 4B, a non-enclosed system inert gas 412 can be locally flowed to the alloy through outlet 410 (or alternatively sheets of metallic glass material, not shown) being heated by the heater.

The selective heating methods described herein can be used to form specific metallic glass structures. These structures can have mechanical properties, including increased hardness, over conventional materials known in the art.

In various embodiments, the platen can be cooled by any suitable method such as flowing liquid or gas therethrough, e.g., water cooling, gas cooling, or thermal electric cooling. The platen can be cooled at a sufficiently high rate to ensure that the fused powder is maintained as fully amorphous (or its desired amorphous state). As discussed herein, amorphous metals can be crystallized by high temperature/time exposures. In this regard, a layer may have an amorphous microstructure when first melted following deposition and heating according to a method described herein. However, without controlled cooling, previous layers of amorphous metal may be transformed to a crystalline microstructure during deposition and heating of subsequent layers due to heat conduction.

In embodiments herein, the existence of a supercooled liquid region in which the bulk metallic glass can exist as a high-viscous liquid allows for superplastic forming. Large plastic deformations can be obtained. The ability to undergo large plastic deformation in the supercooled liquid region is used for the forming and/or cutting process. As oppose to solids, the liquid bulk solidifying metallic glass-forming alloy deforms locally, which drastically lowers the required energy for cutting and forming. The ease of cutting and forming depends on the temperature of the alloy, the mold, and the cutting tool. As the temperature becomes higher, the viscosity becomes lower, and consequently cutting and forming is easier.

Embodiments herein can utilize a thermoplastic forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The parameters used in the printing methods described herein can depend on the metallic glass alloy. The metallic glass-forming alloy components (powder or sheets) can be at or below the critical casting thickness and the final three-dimensional part can have thickness that is thicker than the critical casting thickness. This technique could similarly be used to produce bulk three-dimensional parts using amorphous alloys that would not traditionally be considered as bulk glass-formers, since fully amorphous powder can be made with very small particle sizes. Moreover, the time and temperature of the heating and shaping operation is selected such that the elastic strain limit of the metallic glass-forming alloy could be substantially preserved to be not less than 1.0%, and preferably not being less than 1.5%. In the context of the embodiments herein, temperatures around glass transition mean the forming temperatures can be below glass transition, at or around glass transition, and above glass transition temperature, but preferably at temperatures below the crystallization temperature Tx. The cooling step is carried out at rates similar to the heating rates at the heating step, and preferably at rates greater than the heating rates at the heating step. The cooling step is also achieved preferably while the forming and shaping loads are still maintained.

Figure 5:
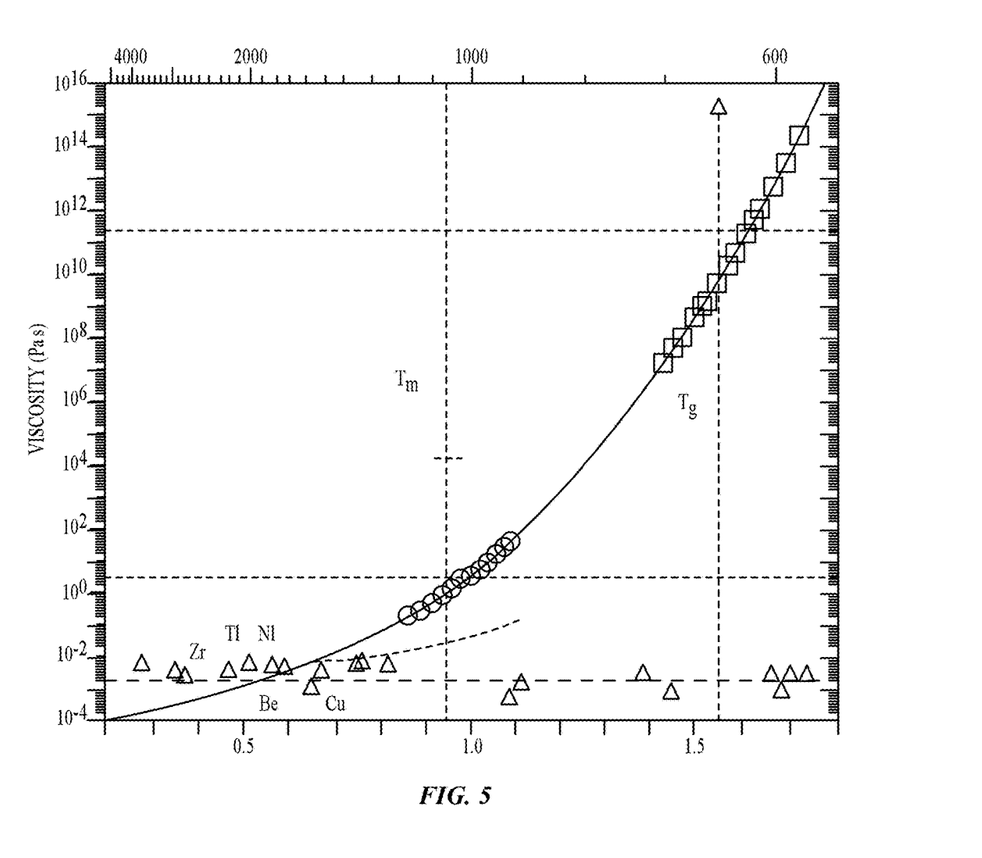
FIG. 5 depicts a temperature-viscosity diagram of an exemplary bulk solidifying amorphous alloy.

FIG. 5 shows a viscosity-temperature graph of an exemplary bulk solidifying metallic glass-forming alloy, from an exemplary series of Zr—Ti—Ni—Cu—Be alloys manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying metallic glass-forming alloys can be around glass transition temperature, where the alloy will practically act as a solid for the purposes of pulling out the quenched amorphous sheet product.

Figure 6:
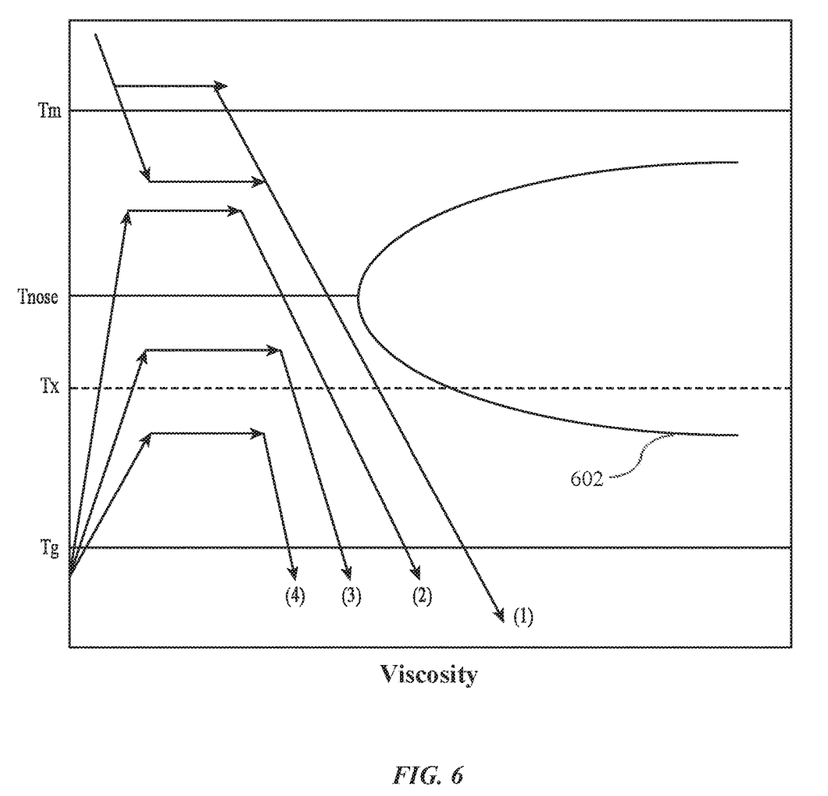
FIG. 6 depicts a schematic of a time-temperature-transformation (TTT) diagram for an exemplary bulk solidifying amorphous alloy.

FIG. 6 shows the time-temperature-transformation (TTT) cooling curve 602 of an exemplary bulk solidifying amorphous alloy, or TTT diagram. Bulk-solidifying amorphous metals do not experience a liquid/solid crystallization transformation upon cooling, as with conventional metals. Instead, the highly fluid, non-crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a melting temperature Tm may be defined as the thermodynamic liquidus temperature of the corresponding crystalline phase. FIG. 6 shows processing methods of die casting from at or above Tm to below Tg without example time-temperature trajectory (1) hitting the TTT curve. Time-temperature trajectories (2), (3), and (4) depict processes at or below Tg being heated to temperatures below Tm. Under this regime, the viscosity of bulk-solidifying amorphous alloys at or above the melting temperature Tm could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the metallic glass parts. Furthermore, the cooling rate of the molten metal to form a metallic glass part has to be such that the time-temperature profile during cooling does not traverse through the nose-shaped region bounding the crystallized region in the TTT diagram of FIG. 6. In FIG. 6, Tnose (at the peak of crystallization region) is the critical crystallization temperature Tx where crystallization is most rapid and occurs in the shortest time scale.

The supercooled liquid region, the temperature region between Tg and Tx is a manifestation of the stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 6, Tx is shown as a dashed line as Tx can vary from close to Tm to close to Tg.

The schematic TTT diagram of FIG. 6 shows processing methods of die casting from at or above Tm to below Tg without the time-temperature trajectory (shown as (1)) as an example trajectory) hitting the TTT curve. During die casting, the forming takes place substantially simultaneously with fast cooling to avoid the trajectory hitting the TTT curve. The processing methods for superplastic forming (SPF) can range from at or below Tg to below Tm without the time-temperature trajectory (shown as (2), (3) and (4) as example trajectories) hitting the TTT curve. In SPF, the amorphous bulk metallic glass is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm," but one would have not reached Tx.

Typical differential scanning calorimeter (DSC) heating curves of bulk-solidifying metallic glass-forming alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying metallic glass-forming alloy at a rapid heating rate as shown by the ramp up portion of trajectories (2), (3) and (4) in FIG. 6, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

In some aspects, the disclosure is directed to imparting a surface compressive stress on an amorphous metal printed part, using a cast-in shrinking core. In various aspects, the cast core can improve various mechanical properties of the metallic glass part.

Failures in load bearing parts often initiate from surfaces of the part. For example, a tensile stress can initiate a tear or crack at a surface flaw on a part. This is especially observed in brittle materials such as bulk metallic glasses. Further, tensile stress is highest at the surface of a part when it is bent. The material yield for breaking stress is reached at the surface first. Increasing the compressive stress at the part surface can improve reliability in mechanical loading.

In one aspect, the disclosure is directed to metallic glass parts having a metallic glass shell that surrounds an internal alloy core. The core can be any alloy known in the art. In various embodiments, the cast alloy occupies an internal cavity within the metallic glass part so as to be surrounded by a metallic glass shell. In various aspects, the part has mechanical interlocks that allow the alloy to occupy the cavity. The volumetric reduction of the alloy provides a compressive force to the metallic glass shell. The compressive force of the metallic glass shell can improve the reliability of mechanical loading.

Figure 7A:
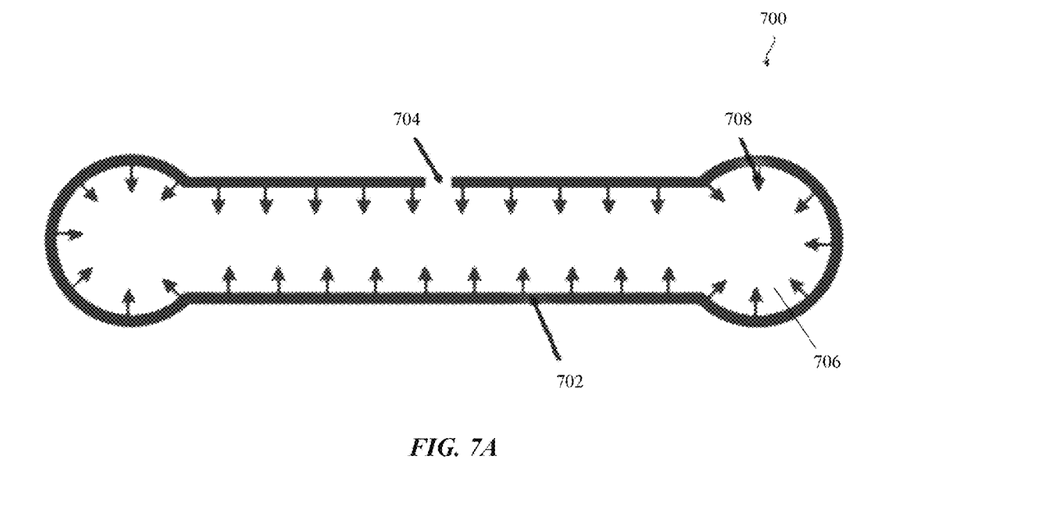
FIG. 7A depicts a metallic glass part having a metallic glass shell surrounding an internal cavity.
Figure 7B:
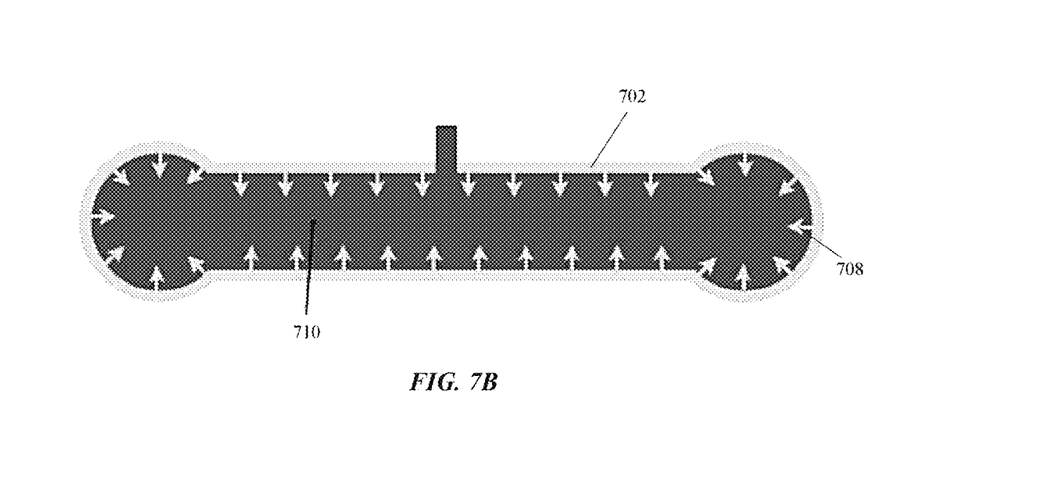
FIG. 7B depicts a metallic glass part having a metallic glass shell surrounding an internal alloy core.

FIG. 7A depicts an example of a metallic glass part 700 having a metallic glass shell 702 and an evacuated core (i.e. internal cavity) 706. FIG. 7B depicts an example of a part 700 having an alloy core 710 in place of the internal cavity 706 of FIG. 7A.

In some embodiments, the metallic glass shell can be constructed by 3D printing, such as by laser heating or electron beam heating as described above. To form the metallic glass shell by printing, a metallic glass alloy is deposited in a pattern to the form the outline of the shell 702 surrounding the internal cavity 706. The deposited metallic glass-forming alloy powder or wire is heated above the glass transition temperature of the metallic glass alloy and cooled to form the metallic glass shell 702. The deposited metallic glass-forming alloy can be heated using a laser, electron beam, or other suitable heater known to one of skill in the art. In some embodiments, the deposited metallic glass-forming alloy is heated for a time less than 5 seconds, less than 1 second, or less than 0.5 seconds. In further embodiments, the metallic glass-forming alloy can be deposited on a platen. In still further embodiments, the metallic glass-forming alloy can be a homogeneous atomized powder.

In other embodiments, the metallic glass shell can be formed by an injection molding method. Forming the metallic glass shell via an injection molding method includes heating a sample of a metallic glass-forming alloy above the glass transition temperature of the metallic glass-forming alloy, applying a deformation force to the heated sample to inject the heated sample into a mold, and cooling to form the metallic glass shell.

After the metallic glass shell 702 is prepared, the alloy is added to the internal cavity 706 via inlet 704 in the shell 702. FIG. 7B depicts an example of the metallic glass shell 702 surrounding a cast alloy core 710. To form the cast alloy core 710, a molten alloy can be injected into the internal cavity 706 via the inlet 704 in the surface of the shell 702. A sufficient amount of the molten alloy should be injected to fill the void space of the internal cavity 706.

After injecting, the molten alloy is allowed to cool in the internal cavity and form the alloy core 710. After the molten alloy is cast and cooled to form the core 710, the alloy core 710 solidifies and engages with the shell via the fixation points 708. The connections between the alloy core 710 and the fixation points create internal compressive force on the part. In various aspects, the fixation points can be any portion of the shell that engages with the alloy to create a bond (e.g. chemical, metallurgical or physical) or mechanical connection between the metallic glass shell and the alloy core. In some embodiments, the fixation points may be a chemical bond, physical bond, metallurgical bond, mechanical bond, or any other chemical or mechanical mechanism for connecting portions of the adjacent surfaces of the metallic glass shell and the alloy core that result in a compressive force on the shell. In some embodiments, the fixation points can connect the shell and the alloy core via chemical bonds, intimate wetting, metallurgical bonds, and physical bonds. For example, without intending to be limiting, in some embodiments, the fixation points can be an interface layer in which a portion of the shell and a portion of the alloy core are fused. In other embodiments, the fixation points can be interlocks, including protrusions that extend from the shell 702 inwardly towards the internal cavity 706. The interlocks can mechanically bond (i.e. engage) the shell and the alloy core. In some instances, the mechanical interlocks can be a hook or any other shaped protrusion that can connect with the alloy core 710.

In alternative embodiments, the metallic glass shell can be formed around the alloy core. By way of example, without intending to be limiting, the alloy core can be formed via a casting or injection molding process and the metallic glass shell can be constructed by 3D printing methods, as described above, around the exterior of the alloy core.

As will be clear to those skilled in the art, the part can be any shape or configuration known in the art. There can be one or more inlets for injecting the molten alloy. The alloy can be any alloy known in the art. In some embodiments, the alloy core and metallic glass shell can have the same alloy composition. In other embodiments, the alloy core and metallic glass shell can be formed from alloys having different compositions.

Any metallic glass-forming alloy in the art may be used in the methods described herein. As used herein, the terms metallic glass alloy, metallic glass-forming alloy, amorphous metal, amorphous alloy, bulk solidifying amorphous alloy, and bulk metallic glass alloy are used interchangeably.

An amorphous or non-crystalline material is a material that lacks lattice periodicity, which is characteristic of a crystal. As used herein, an amorphous material includes glass, which is an amorphous solid that softens and transforms into a liquid-like state upon heating through a glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity, as determined by structural characterization techniques such as x-ray diffraction and transmission electron microscopy.

In one embodiment, a metallic glass-forming alloy composition can be homogeneous with respect to the amorphous phase. A substance that is uniform in composition is homogeneous. This is in contrast to a substance that is heterogeneous. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air, where different ingredients therein are equally suspended, though the particles, gases and liquids in air can be analyzed separately or separated from air. In various embodiments, the particle composition can vary, provided that the final amorphous material has the elemental composition of the metallic glass-forming alloy.

The methods described herein can be applicable to any type of suitable metallic glass-forming alloy. Similarly, the metallic glass-forming alloy described herein as a constituent of a composition or article can be of any type. As recognized by those of skill in the art, metallic glass-forming alloys may be selected based on a variety of potentially useful properties. In particular, metallic glass-forming alloys tend to be stronger than crystalline alloys of similar chemical composition.

The alloy can comprise multiple transition metal elements, such as at least two, at least three, at least four, or more, transitional metal elements. The alloy can also optionally comprise one or more nonmetal elements, such as one, at least two, at least three, at least four, or more, nonmetal elements. A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a metallic glass containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used.

Depending on the application, any suitable nonmetal elements, or their combinations, can be used. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

In some embodiments, the alloy composition described herein can be fully alloyed. The term fully alloyed used herein can account for minor variations within the error tolerance. For example, it can refer to at least 90% alloyed, such as at least 95% alloyed, such as at least 99% alloyed, such as at least 99.5% alloyed, or such as at least 99.9% alloyed. The percentage herein can refer to either volume percent or weight percentage, depending on the context. These percentages can be balanced by impurities, which can be in terms of composition or phases that are not a part of the alloy. The alloys can be homogeneous or heterogeneous, e.g., in composition, distribution of elements, amorphicity/crystallinity, etc.

The alloy can include any combination of the above elements in its chemical formula or chemical composition. The elements can be present at different weight or volume percentages. Alternatively, in one embodiment, the above-described percentages can be volume percentages, instead of weight percentages. Accordingly, a metallic glass-forming alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

Furthermore, the metallic glass-forming alloy can also be one of the exemplary compositions described in U.S. Patent Application Publication Nos. 2010/0300148 or 2013/0309121, the contents of which are herein incorporated by reference.

The metallic glass-forming alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The afore described metallic glass-forming alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium, and hafnium to form carbides and further improve wear and corrosion resistance. Further optional elements may include phosphorous, germanium and arsenic, totaling up to about 2%, and preferably less than 1%, to reduce melting point. Otherwise, incidental impurities should be less than about 2% and preferably 0.5%.

In some embodiments, a composition having a metallic glass-forming alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the metallic glass-forming alloy (with only a small incidental amount of impurities). In another embodiment, the composition includes the metallic glass-forming alloy (with no observable trace of impurities).

In other embodiments, metallic glass-forming alloys, for example, of boron, silicon, phosphorus, and other glass-formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

In further embodiments, mixfunctional elements and alloys can be added to the metallic glass-forming substrate by the methods disclosed herein. Metallic glass composites of materials that were not able to be formed previously can be prepared in this manner. In some variations, a metallic glass-forming alloy can be embedded with another material that imparts specific properties. For example, magnetic alloys and particles can be added to metallic glass-forming alloy powder, such that a non-magnetic metallic glass-forming alloy can be modified to exhibit magnetic properties. Likewise, particles of a ductile material can be added to stop crack tip propagation and improve the toughness of the composite. Heating methods disclosed herein can be used to make such materials by keeping the melted/heat affected zone localized and quiescent (e.g. by reducing mixing of elements between neighboring regions, imparting compositional change). In various aspects, different amounts of heat can be applied to each powder type to tune temperature exposure of each material, for example by using a CCD to identify each powder type, or by the properties of the powder (e.g. reflectivity under particular wavelengths, heat capacity). In another variation, metallic glass-forming and other material powders can be added separately during each layering step.

The methods herein can be valuable in the fabrication of electronic devices using a metallic glass. An electronic device herein can refer to any electronic device known in the art. For example, it can be a telephone, such as a cell phone, a land-line phone, or any communication device, such as a smart phone, including, for example an iPhone®, or an electronic email sending/receiving device. It can be a part of a display, such as a digital display, a TV monitor, an electronic-book reader, a portable web-browser (e.g., iPad®), watch and/or a computer monitor. It can also be an entertainment device, including a portable DVD player, conventional DVD player, Blue-Ray disk player, video game console, music player, such as a portable music player (e.g., iPod®), etc. It can also be a part of a device that provides control, such as controlling the streaming of images, videos, or sounds (e.g., Apple TV®), or it can be a remote control for an electronic device. It can be a part of a computer or its accessories, such as a hard drive tower housing or casing, laptop housing, laptop keyboard, laptop track pad, desktop keyboard, mouse, or speaker. The article can also be applied to a device such as a watch or a clock.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±0.5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

All publications, patents, and patent applications cited in this Specification are hereby incorporated by reference in their entirety.

While this invention has been described with reference to specific embodiments, it will be understood by those skilled in the art that various changes may be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:

1. A part comprising:
    an alloy core; and
    a metallic glass shell surrounding the alloy core;
    the alloy core providing a compressive force on the metallic glass shell at an interface between the alloy core and the metallic glass shell, wherein the metallic glass shell and alloy core compromise the same alloy composition.

2. The part of claim 1 wherein the interface is a chemical bond between the alloy core and the metallic glass shell.

* * * * *